United States Patent
Asveren

(10) Patent No.: US 9,742,728 B2
(45) Date of Patent: Aug. 22, 2017

(54) DETERMINING EXPIRATION TIME OF BINDINGS FOR NETWORK ADDRESS TRANSLATION DEVICES

(75) Inventor: Tolga Asveren, Bordentown, NJ (US)

(73) Assignee: SONUS NETWORKS, INC., Westford, MA (US)

( * ) Notice: Subject to any disclaimer, the term of this patent is extended or adjusted under 35 U.S.C. 154(b) by 1153 days.

(21) Appl. No.: 13/221,659

(22) Filed: Aug. 30, 2011

(65) Prior Publication Data
US 2013/0054762 A1 Feb. 28, 2013

(51) Int. Cl.
*H04L 29/12* (2006.01)

(52) U.S. Cl.
CPC ................ *H04L 61/2553* (2013.01)

(58) Field of Classification Search
CPC ............. H04W 4/00; H04L 61/2553
USPC ........................................ 220/220
See application file for complete search history.

(56) References Cited

U.S. PATENT DOCUMENTS

| | | | |
|---|---|---|---|
| 7,260,623 B2 * | 8/2007 | Wookey et al. | 709/223 |
| 7,293,077 B1 * | 11/2007 | Teo et al. | 709/221 |
| 7,359,919 B2 * | 4/2008 | Cohen et al. | |
| 7,693,084 B2 | 4/2010 | Herzog | 370/251 |
| 7,702,726 B1 * | 4/2010 | Grabelsky et al. | 709/204 |
| 7,716,370 B1 * | 5/2010 | Devarapalli | 709/245 |
| 7,738,468 B2 * | 6/2010 | Standridge | H04L 12/24 370/401 |
| 7,779,282 B2 * | 8/2010 | Ramachandran | G06F 1/3203 370/310 |
| 7,954,152 B2 * | 5/2011 | Shiran | H04L 63/1466 709/201 |
| 8,375,134 B2 * | 2/2013 | Herzog | H04L 67/141 370/241 |
| 8,949,391 B2 * | 2/2015 | Kettlewell | H04L 29/12009 709/223 |
| 9,160,794 B2 * | 10/2015 | Lin | H04L 12/2697 |
| 9,210,735 B2 * | 12/2015 | Sarikaya | H04L 61/251 |
| 2006/0029083 A1 * | 2/2006 | Kettlewell | H04L 29/12009 370/401 |

(Continued)

OTHER PUBLICATIONS

RFC-5128; Title:State of Peer-to-Peer (P2P) Communication across Network Address Translators (NATs); Date: Mar. 2008; Author: Srisuresh et al.*

(Continued)

*Primary Examiner* — Uzma Alam
(74) *Attorney, Agent, or Firm* — Stephen T. Straub; Ronald P. Straub; Michael P. Straub

(57) ABSTRACT

Methods and apparatuses, including computer program products, are described for determining expiration time of bindings for NAT devices. A first device receives a first request including a first source IP address/port pair of a first NAT binding, and transmits a response. The first device receives a second request including a second source IP address/port pair of a second NAT binding, and transmits a response. The first device sets a refresh time T1 of the first NAT binding to be shorter than an expected minimum expiration time of the first NAT binding, transmits one or more messages via the second NAT binding where a sending interval time T2 of the second NAT binding is longer than T1, increments T2 when a response is received, and if a response to any of the messages is not received, sets T1 equal to the last T2 value for which a response was received.

40 Claims, 9 Drawing Sheets

(56) References Cited

U.S. PATENT DOCUMENTS

| | | | |
|---|---|---|---|
| 2006/0047836 A1* | 3/2006 | Rao et al. | 709/229 |
| 2006/0230155 A1* | 10/2006 | Verma | 709/227 |
| 2007/0058792 A1* | 3/2007 | Chaudhari et al. | 379/88.17 |
| 2008/0126528 A1* | 5/2008 | Takeda et al. | 709/223 |
| 2008/0148378 A1* | 6/2008 | Wing | H04L 29/12386 726/11 |
| 2009/0055543 A1* | 2/2009 | Rasanen | 709/228 |
| 2009/0097477 A1 | 4/2009 | Zhu | 370/352 |
| 2009/0187971 A1* | 7/2009 | Bao et al. | 726/3 |
| 2009/0305700 A1* | 12/2009 | Levy | H04L 29/06 455/435.1 |
| 2009/0323632 A1* | 12/2009 | Nix | 370/331 |
| 2010/0169478 A1* | 7/2010 | Saha et al. | 709/224 |
| 2010/0183151 A1* | 7/2010 | Wing | H04L 63/029 380/257 |
| 2010/0217874 A1* | 8/2010 | Anantharaman et al. | 709/228 |
| 2010/0278101 A1* | 11/2010 | Bengtsson | H04L 29/12471 370/328 |
| 2012/0131663 A1* | 5/2012 | Anchan | H04L 29/12471 726/13 |

OTHER PUBLICATIONS

Title: Adapting to NAT timeout values in P2P Overlay Networks; Author: Price et al; 2010.*
RFC3261—SIP Session Initiation Protocol; Jun. 2002; Rosenberg et al.*
(Title: SDP protocol—RFC4566; The internet society (2006)).*
Jennings et al., "Managing Client-Initiated Connections in the Session Initiation Protocol (SIP)," *Standards Track*, RFC 5626 (2009) pp. 1-50.

* cited by examiner

DETERMINING EXPIRATION TIME OF BINDINGS FOR NETWORK ADDRESS TRANSLATION DEVICES

FIELD OF THE INVENTION

The subject matter of this application relates generally to methods and apparatuses, including computer program products, for determining expiration time of bindings for network address translation (NAT) devices.

BACKGROUND OF THE INVENTION

The growth of Internet Protocol (IP)-based networks as carriers for various types of digital communications has led to the advent of application protocols used to negotiate and define the parameters of a communications session between two peer computing devices. One example of such an application protocol is Session Initiation Protocol (SIP), commonly used for establishing and managing Voice-over-IP (VoIP) connections.

Along with the rise of IP-based networks and digital communications has come the need to protect such networks and the devices that reside on them from security vulnerabilities and attacks. To provide for secure communications, many private communication networks connect to public networks (e.g., Internet) using a network security device, such as a firewall device, a NAT device, or a computing device executing software that performs firewall, NAT, and/or other security functions. Generally, these types of network security devices mask the local addresses of client devices within the private network.

FIG. 1 is a block diagram illustrating a typical network configuration 100 for providing secure communications between private communications networks. The configuration 100 includes two client computing devices 102a and 102b, two NAT devices 104a and 104b, located within private networks 106a and 106b, respectively, which act as an interface between the client devices 102a and 102b and the network device 108. As shown in FIG. 1, client device 102a in private network 106a establishes a session (e.g., SIP session) with client device 102b by communicating with NAT device 104a, which transmits the communication via the network device 108 to NAT device 104b in private network 106b and then to client device 102b.

For security purposes, most NAT devices prevent unsolicited inbound communications from reaching client devices that are located behind them in the network. Instead, most NAT devices allow inbound communications, such as IP packets, to reach a client device only if an existing packet flow already exists that matches the inbound packets. In general, a flow is defined with a source IP address, source port, destination IP address, destination port and protocol type (e.g., TCP). A flow is created by a packet sent from the client device (or endpoint) behind the NAT device to the network. When the initial packet sent from the client device reaches the NAT device, the NAT device creates a binding associated with the packet. The binding maps the static, private IP address of the client device to a temporary public IP address selected by the NAT device from a pool of reusable IP addresses. Because the NAT device has a finite number of reusable IP addresses, a binding created by a NAT device is also associated with a timeout value. If no packets that use the binding are received by the NAT within the timeout window, then the binding is removed from the NAT device and the temporary IP address is returned to the pool for future use.

The paradigm of requiring a client device to initiate a flow and allowing a binding to expire if not used within a certain amount of time presents certain difficulties in the context of a SIP session. For example, it is common for a network device (e.g., a VoIP server) to send a SIP INVITE request to a client device that is located behind a NAT device in order to set up a SIP session (e.g., a VoIP call). However, unless the client device had already established a flow with the network device by sending a packet to the network, the IP packet carrying the INVITE request would be intercepted by the NAT device and be prevented from reaching the client device. Therefore, a client device may register for SIP sessions by transmitting an SIP REGISTER message to the network device, which creates a binding at the NAT device to be used for SIP signaling. However, because the NAT binding is associated with a timeout value, the registration of the client device must be refreshed regularly to avoid removal of the binding.

Some commonly-used methods of refreshing the registration are:

Fast Registration Refresh
    The network device may force the client device to use short refresh intervals to keep the binding open. The refresh interval must be shorter than the NAT binding timeout value.

Simple Traversal of UDP Through NATs (STUN) Keepalives
    STUN keepalive messages are sent periodically by the client device to keep the binding alive. The sending interval must be shorter than the NAT binding timeout value.

Sending Empty Lines as SIP Messages
    Carriage Return-Line Feed (CRLF) characters are sent periodically by the client device. The sending interval must be shorter than the NAT binding timeout value.

All of the above-referenced methods for refreshing the registration require that the sending interval be shorter than the NAT binding timeout value. However, the NAT binding timeout value is generally not known by the network device prior to establishing a registration because the NAT devices are not controlled by the operator of the network device. Accordingly, the network device must force the sending interval to be less than the lowest anticipated NAT binding timeout value—resulting in the potential transmission of a large number of refresh messages in order to ensure that the bindings are kept alive. This additional traffic substantially hampers network bandwidth and performance, and also affects the power consumption and efficiency of the client devices. For example, if a sending interval is set to 30 seconds, 10% of NAT devices have a binding timeout value of 45 seconds and 90% of NAT devices a binding timeout value of 120 seconds, more than double of the messages sent to keep the bindings alive are unnecessary. Therefore, it is desirable to estimate the NAT binding timeout value as accurately as possible without the potential of underestimation.

One method of learning the NAT binding timeout value is to increase the SIP registration refresh time gradually, while also making use of SIP OPTIONS requests. This learning method operates as follows:

i) Initially the refresh interval is set to x, where x is known as being an estimate of the shortest binding lifetime used by a NAT device;

ii) Before x expires but close to its expiration time, one or more SIP OPTIONS messages are sent from the network device to the client device. If the network device receives replies to the SIP OPTIONS messages, this indicates that the binding in the NAT device is still alive and the OPTIONS messages were received by the client device. The refresh interval x is increased by y unless x+y>Max, where Max is the upper limit provisioned for the sending interval. If the network device does not receive a reply, x is decreased by z. In either case, transmission of SIP OPTIONS messages is repeated with the new value of x. The process stops if x+y>Max, or if x keeps changing within a narrow range.

iii) After the binding timeout estimation is completed, this value is used as the registration expiration value. This state is referred to as "stable state." SIP OPTIONS messages are sent periodically close to the expiration time to determine whether the NAT binding timeout value has changed. If the network device does not receive a reply, this indicates that the NAT binding timeout value has changed and the network device restarts the process of determining the timeout value.

However, the above learning method has certain disadvantages. This learning method starts from the lowest possible NAT binding timeout value and increases gradually in small steps. As a result, the learning method takes a long time to complete. Also, when a sending interval bigger than the NAT binding timeout value is used, there will be a period during which the NAT binding is removed but the registration refresh timer has not yet expired. In this period, SIP calls initiated from the network device will not be able to reach the client device.

SUMMARY OF THE INVENTION

In general overview, the techniques described herein are related to efficient determination of binding timeouts for NAT devices. The techniques advantageously provide for a dynamic process for determining an accurate binding timeout value associated with a particular NAT device that reduces network bandwidth usage and minimizes connection interruptions. The result is an efficient technique for learning NAT binding timeout values and maintaining active NAT bindings efficiently and without requiring control over or operation of the NAT device. The techniques overcome the problem of inefficient timeout probing that causes increased network traffic and impacts the processing throughput of both servers and remote computing devices which communicate through the NAT device.

The invention, in one aspect, features a method for determining expiration time of bindings for network address translation (NAT) devices. A first computing device receives a first request including a first source IP address/port pair associated with a first NAT binding from a remote computing device via a NAT device. The first computing device transmits a response to the first request to the remote computing device. The first computing device receives a second request including a second source IP address/port pair associated with a second NAT binding from the remote computing device via the NAT device. The first computing device transmits a response to the second request. The first computing device sets a refresh interval time T1 of the first NAT binding to be shorter than an expected minimum binding expiration time of the first NAT binding. The first computing device transmits one or more query messages to the remote computing device via the second NAT binding where a sending interval time T2 of the second NAT binding is longer than T1. The first computing device increments T2 for each query message transmitted when a response to the query message is received, and if a response to any of the transmitted query messages is not received, sets T1 equal to the last T2 value for which a response to a query message was received.

The invention, in another aspect, features a system for determining expiration time of bindings for NAT devices. The system includes a first computing device configured to receive, from a remote computing device via a NAT device, a first request including a first source IP address associated with a first NAT binding and transmit, to the remote computing device via the NAT device, a response to the first request. The first computing device is configured to receive, from the remote computing device via the NAT device, a second request including a second source IP address associated with a second NAT binding and transmit, to the remote computing device via the NAT device, a response to the second request. The first computing device is configured to set a refresh interval time T1 of the first NAT binding to be shorter than an expected minimum expiration time of the first NAT binding, and transmit, to the NAT device, one or more query messages via the second NAT binding, where a sending interval time T2 of the second NAT binding is longer than T1. The first computing device is configured to increment T2 for each query message transmitted when a response to the query message is received, and if a response to any of the transmitted query messages is not received, set T1 equal to the last T2 value for which a response to a query message was received.

The invention, in another aspect, features a computer program product, tangibly embodied in a computer readable storage device, for determining expiration time of bindings for NAT devices. The computer program product includes instructions operable to cause a first data processing apparatus to receive, from a remote computing device via a NAT device, a first request including a first source IP address associated with a first NAT binding, and transmit, to the remote computing device via the NAT device, a response to the first request. The computer program product includes instructions operable to cause the first data processing apparatus to receive, from the remote computing device via the NAT device, a second request including a second source IP address associated with a second NAT binding, and transmit, to the remote computing device via the NAT device, a response to the second request. The computer program product includes instructions operable to cause the data processing apparatus to set a refresh interval time T1 of the first NAT binding to be shorter than an expected minimum expiration time of the first NAT binding, and transmit, to the NAT device, one or more query messages via the second NAT binding, where a sending interval time T2 of the second NAT binding is greater than T1. The computer program product includes instructions operable to cause the first data processing apparatus to increment T2 for each query message transmitted when a response to the query message is received, and if a response to any of the transmitted query messages is not received, set T1 equal to the last T2 value for which a response to a query message was received.

In some embodiments, any of the above aspects can include one or more of the following features. In some embodiments, the first source IP address/port pair and the second source IP address/port pair are associated with a fully qualified domain name (FQDN) of the first computing device or of a group of computing devices. In some embodiments, the first request and the second request are SIP REGISTER messages. In some embodiments, the response to the first request is an error message and the response to the second request is a success message.

In some embodiments, the query message is a SIP OPTIONS message. In some embodiments, the response to the first request is a 302 Redirect message. In some embodiments, the first computing device periodically transmits a test message to the remote device once T1 is set to the last T2 value for which a response to a query message was received, and in the event that a response to the test message is not received by the first computing device, repeats the steps of determining expiration time of bindings for NAT devices.

In some embodiments, a third computing device is configured to receive a third request including a third source IP address/port pair associated with a third NAT binding from the remote computing device via the NAT device, transmit a response to the third request, transmit one or more query messages to the NAT device via the third NAT binding, where a sending interval time T3 of the third NAT binding is longer than T1. The third computing device is configured to increment T3 for each query message transmitted when a response to the query message is received, and if a response to any of the transmitted query messages is not received, transmit, to the first computing device, the last T3 value for which a response to a query message was received, where the first computing device is configured to set T1 equal to T3.

In some embodiments, the response to the first request includes an indicator message to the remote computing device to set T1 to be shorter than the last T3 value for which a response to a query message was received. In some embodiments, the first request includes an indicator message to the first computing device to set T1 to be shorter than the last T3 value for which a response to a query message was received. In some embodiments, the response to the first request includes an indicator message to the remote computing device to stop transmitting refresh messages. In some embodiments, the first computing device, upon receipt of a response to the query message, transmits an indicator message to the remote computing device to start transmitting refresh messages.

In some embodiments, the indicator message includes T2. In some embodiments, the first computing device transmits a message including T1 to the remote computing device. In some embodiments, the message is a STUN message and the value is a STUN message attribute. In some embodiments, the message is a SIP signaling message and the value is a SIP header or a SIP parameter.

In some embodiments, the incrementing step includes incrementing, by the first computing device, T2 by a time value T7 for each received response to the query message, if a response to any of the transmitted query messages is not received, decreasing T7 and setting, by the first computing device, T2 equal to the last T2 value for which a response to a query message was received plus T7, and when T7 is less than a threshold T9, setting, by the first computing device, T1 equal to the last T2 value for which a response to a query message was received. In some embodiments, T7 and T9 are configurable.

In some embodiments, the setting T1 equal to the last T2 value step includes if a response to any of the transmitted query messages is not received, re-transmitting, by the first computing device, the query messages for which no response was received, using an interval T11. In some embodiments, T11 is configurable. In some embodiments, the re-transmitting occurs a predetermined number of times. In some embodiments, the number of times that re-transmitting occurs is configurable.

In some embodiments, a third computing device is configured to receive, from the remote computing device via the NAT device, a third request including a third source IP address associated with a third NAT binding, transmit a response to the third request to the remote computing device via the NAT device, transmit one or more query messages via the third NAT binding to the NAT device, where a sending interval time T3 of the third NAT binding is longer than T1. The third computing device is configured to increment T3 for each query message transmitted, when a response to the query message is received, and if a response to any of the query messages is not received, transmit to the first computing device the last T3 value for which a response to a query message was received, where the first computing device sets T1 equal to T3.

In some embodiments, the computer program product includes instructions operable to cause the data processing apparatus to periodically transmit a test message to the remote device once T1 is set to the last T2 value for which a response to a query message was received, and in the event that a response to the test message is not received by the first computing device, repeat the steps of determining expiration time of bindings for NAT devices.

In some embodiments, the computer program product includes instructions operable to cause a second data processing apparatus to receive a third request including a third source IP address associated with a third NAT binding from the remote computing device via the NAT device, transmit a response to the third request to the remote computing device via the NAT device, transmit one or more query messages via the third NAT binding to the NAT device, where a sending interval time T3 of the third NAT binding is longer than T1. The computer program product includes instructions operable to cause the second data processing apparatus to increment T3 for each query message transmitted, if a response to the query message is received, and if a response to any of the transmitted query messages is not received, transmit to the first data processing apparatus the last T3 value for which a response to a query message was received, where the first data processing apparatus sets T1 equal to T3.

In some embodiments, the computer program product includes instructions operable to cause the data processing apparatus to increment T2 by a time value T7 for each received response to the query message, if a response to any of the transmitted query messages is not received, decrease T7 and set T2 equal to the last T2 value for which a response to a query message was received plus T7, and when T7 is less than a threshold T9, set T1 equal to the last T2 value for which a response to a query message was received. In some embodiments, T7 and T9 are configurable.

In some embodiments, the computer program product includes instructions operable to cause the data processing apparatus to re-transmit, if a response to any of the transmitted query messages is not received, the query messages for which no response was received, using an interval T11. In some embodiments, T11 is configurable. In some embodiments, the re-transmitting occurs a predetermined number of times. In some embodiments, the number of times that re-transmitting occurs is configurable.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by refer

DETAILED DESCRIPTION

Figure 1:
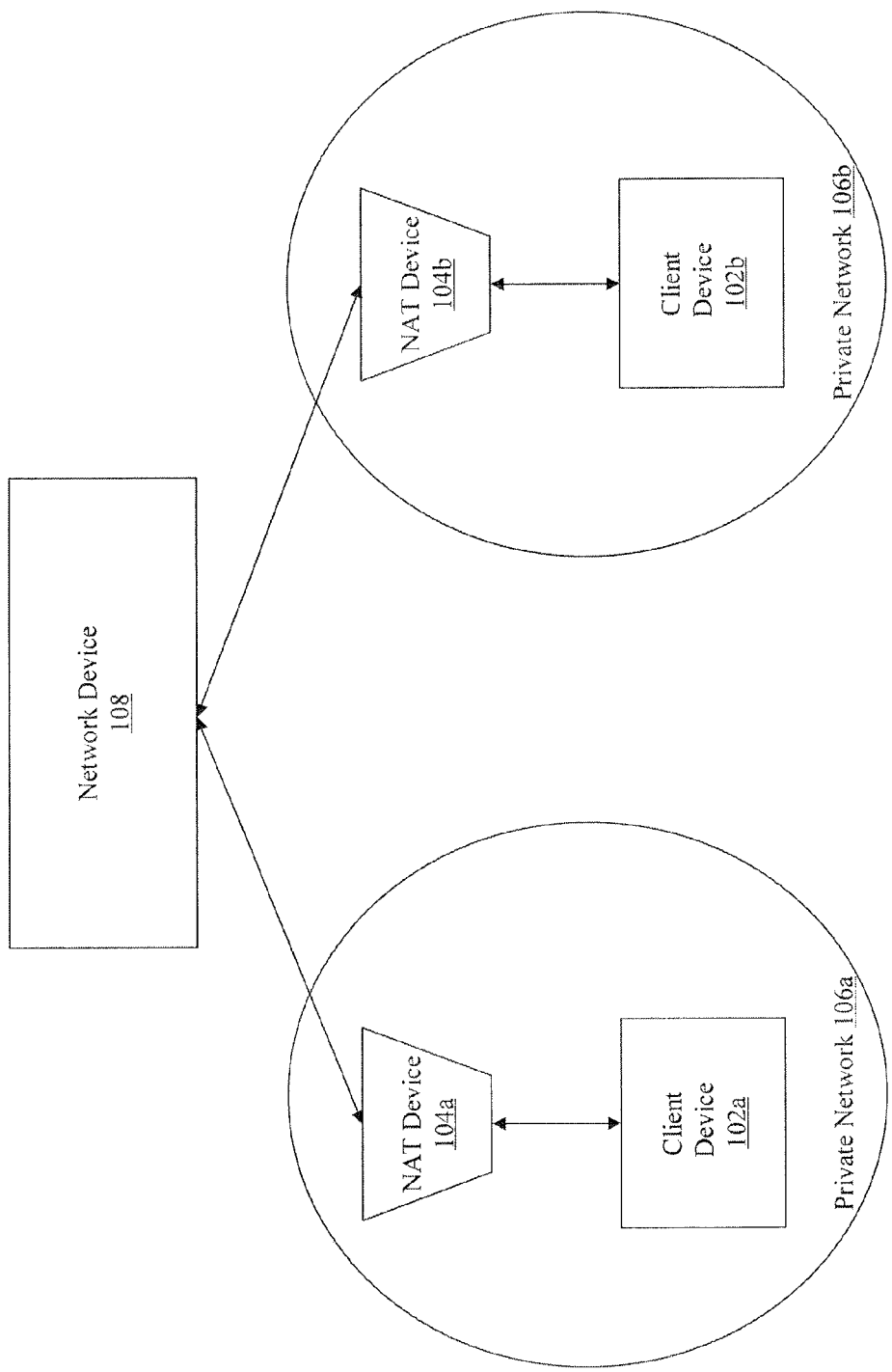
- FIG. 1 is a block diagram illustrating a typical network configuration for providing secure communications between private communications networks.
Figure 2:
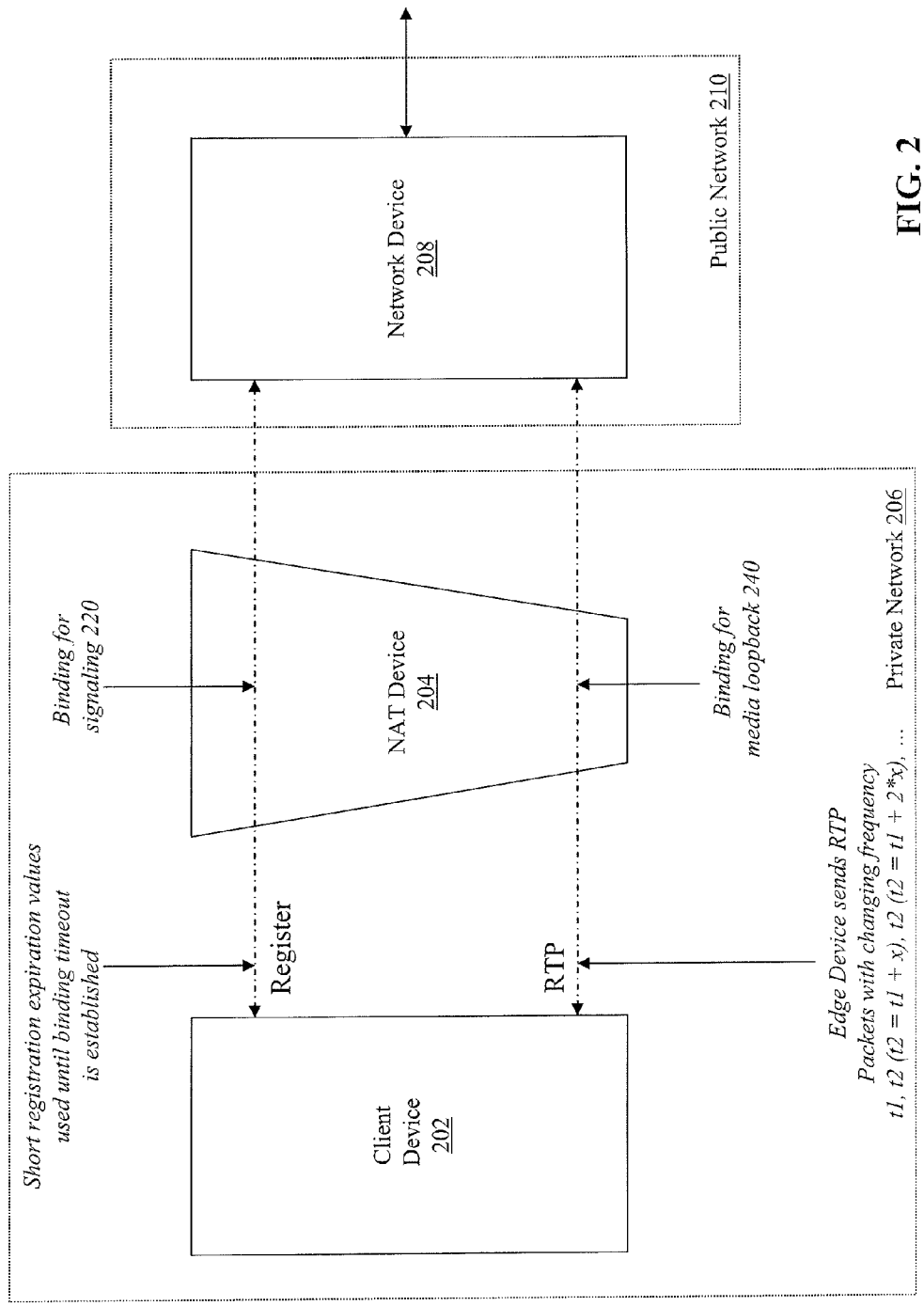
FIG. 2 is a block diagram of a system for determining expiration time of bindings for NAT devices.

FIG. 2 is a block diagram of a system 200 for determining expiration time of bindings for NAT devices. The system 200 includes a client device 202 and a NAT device 204 located within a private network 206. The system 200 further includes a network device 208 located in a public network 210. Although FIG. 2 shows network device 208 in public network 201, it should be understood that other architectures and network configurations may be employed. For example, network device 208 can be located within private network 208. In this example, network device 208 can be an edge device, such as a session border controller (SBC), which connects to other devices (not shown) in an external public network (e.g., the Internet). One of ordinary skill in the art will understand that the techniques described herein can be implemented on many different server types, network configurations, and/or computing devices without departing from the spirit or scope of the invention.

The client device 202 is a computing device that uses the NAT device 204 to send packets to public network 210. In some embodiments, the client device 202 is a mobile device capable of initiating and receiving VoIP calls via an IP-based protocol (e.g., SIP), such as a smartphone, tablet computer, or other personal computing device. The NAT device 204 is a computing device configured to perform functions associated with the routing of packet-based traffic between the client device 202 and the network device 208, including but not limited to translation of an IP address/port assigned to the client device to an IP address/port available for exposure to the network device 208 and creation of bindings 220 and 240 (e.g., in a mapping table) to record the currently operative IP address/port translations.

The network device 208 is a computing device (e.g., a server) configured to connect to the NAT device 204 and the client device 202 in the private network 206. In some embodiments, the network device 208 is configured to host and execute services in response to requests for service from remote devices. One example of such services is VoIP telephony.

Figure 3:
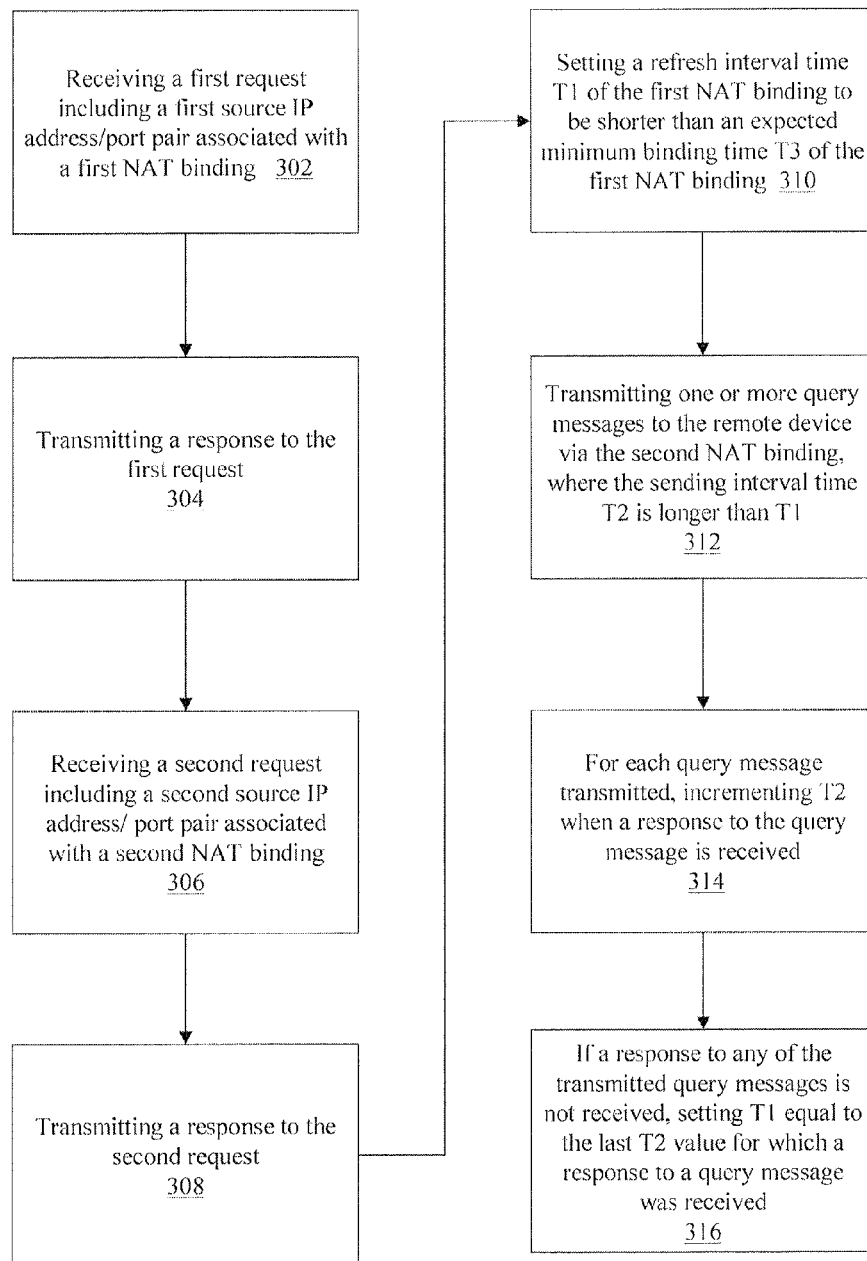
FIG. 3 is a flow diagram of a process for determining expiration time of bindings for NAT devices.

FIG. 3 is a flow diagram of a process 300 for determining expiration time of bindings for NAT devices (e.g., NAT device 204 in FIG. 2) used in communications between a client device (e.g., client device 202 in FIG. 2) and a network device (e.g., network device 208 in FIG. 2). The network device 208 receives (302) a first request (e.g., a SIP register request) from the client device 202 via the NAT device 204. When the NAT device 204 receives the first request, the NAT device 204 translates the source IP address/port of the client device 202 into a temporary IP address/port available for use in a public network (e.g., public network 210 in FIG. 2). The NAT device 204 also creates a binding (e.g., registration binding 220 in FIG. 2) that stores the mapped relationship between the source IP address/port of the client device 202 and the temporary IP address/port.

After receiving the first request, the network device 208 transmits (304) a response to the first request to the client device 202 via the NAT device 204. The response includes, as the destination IP address/port, the temporary IP address/port previously assigned to the first request by the NAT device 204. Upon receiving the response, the NAT device 204 uses the binding 220 associated with the temporary IP address/port to locate the IP address/port of the client device 202 and transmit the response. Based on the request/response traffic flow, the NAT device 204 keeps binding 220 alive.

The network device 208 receives (306) a second request (e.g., an RTP packet) from the client device 202 via the NAT device 204. When the NAT device 204 receives the second request, the NAT device 204 again translates the source IP address/port of the client device 202 into another temporary IP address/port available for use in public network 210. The NAT device 204 creates a second binding (e.g., media loopback binding 240) with the source IP address/port of the client device 202 and the new temporary IP address/port.

After receiving the second request, the network device 208 transmits (308) a response to the second request to the client device 202 via the NAT device 204. The response includes, as the destination IP address/port, the temporary IP address/port previously assigned to the second request by the NAT device 204. Upon receiving the response, the NAT device 204 uses the binding 240 associated with the temporary IP address/port to locate the IP address/port of the client device 202 and transmit the response. Based on the request/response traffic flow, the NAT device 204 keeps binding 240 alive.

The network device 208 sets (310) a refresh interval time T1 of NAT binding 220 to be shorter than an expected minimum expiration (or binding timeout) value of NAT binding 220. This technique provides the advantage of keeping NAT binding 220 open so that the signaling connection between client device 202 and network device 208 is not interrupted as the optimal binding timeout value associated with NAT device 204 is determined.

The network device 208 then uses the other NAT binding 240 as a probing channel to determine the optimal binding timeout value. To accomplish this, the network device 208 transmits (312) one or more query messages (e.g., RTP packets) to the client device 202 using NAT binding 240. The network device 208 assigns a sending interval time T2 to NAT binding 240 that is longer than the previously-established refresh interval time T1 of NAT binding 220. In the event that the network device 208 receives a response to a transmitted query message from the client device 202, the network device 208 determines that NAT binding 240 is still alive at NAT device 204 and, therefore, the NAT binding timeout value is at least equal to T2. Based on this knowledge, the network device 208 increments (314) T2 (e.g., by a predetermined length) upon receiving the response to the query message. The transmission of query messages and corresponding incrementing of T2 continue until network device 208 does not receive a response to a transmitted query message. In the event that the network device 208 does not receive a response to a query message, the network device 208 determines that NAT binding 240 is no longer alive at NAT device 204 and the NAT binding timeout value is less than the current sending interval time. The network device 208 sets (316) T1 equal to the last T2 value for which a response to a query message was received.

In some embodiments, the network device 208 transmits a query message with a sending interval time that is shorter than the last sending interval time but longer than the current refresh interval time of the first NAT binding. This technique relies on conducting a new RTP loopback test call so that binding 240 is recreated by the client device 202 sending an RTP packet. In some embodiments, the network device 208 re-transmits a query message for which the network device 208 did not receive a response. The network device 208 can re-transmit the query message according to a predetermined time interval. The predetermined time interval can be configurable, e.g., at the network device 208. The network device 208 can re-transmit the query message any number of times. In some embodiments, the re-transmission occurs for a predetermined number of times. The predetermined number of re-transmissions can be configurable, e.g., at the network device 208. These techniques are applicable to any of the embodiments discussed herein.

In some embodiments, once the difference between the sending interval time of the last successful request/response cycle and the next incremental sending interval time is less than a predetermined threshold, the process terminates and the sending interval time of the last successful request/response cycle is used as the optimal registration binding expiration time. In the event that registration binding 220 is subsequently deleted, the network device 208 restarts the process of determining the binding expiration time.

Figure 4:
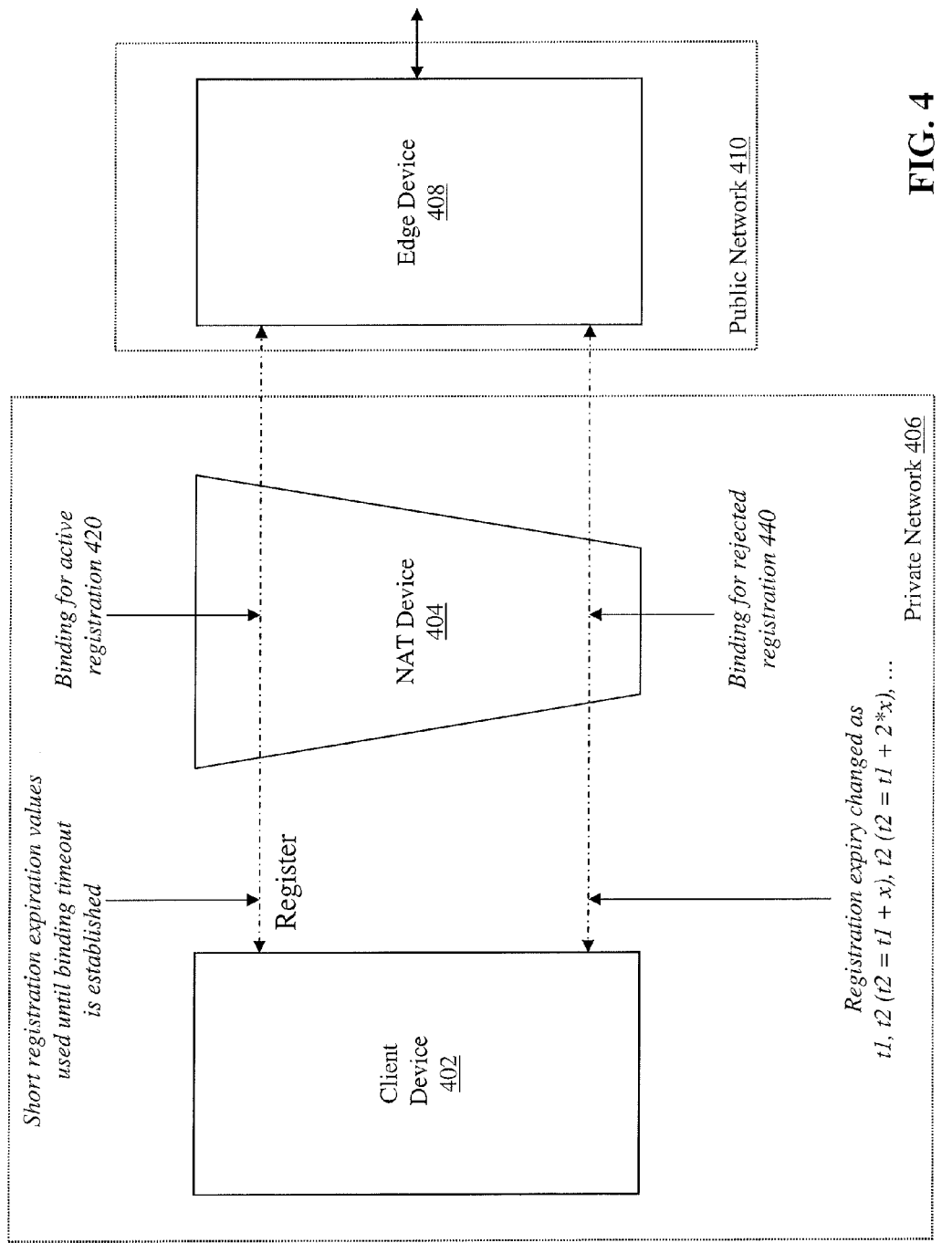
FIG. 4 is a block diagram of a system for determining expiration time of bindings for NAT devices using a fully qualified domain name (FQDN).

FIG. 4 is a block diagram of a system 400 for determining expiration time of bindings for NAT devices using a fully qualified domain name (FQDN). The system 400 includes a client device 402 and a NAT device 404 located within a private network 406. The system 400 further includes a network device 408 located in a public network 410. In this embodiment, the address of network device 408 is configured as a FQDN in the client device 402. The FQDN resolves to multiple IP address/port pairs, which are hosted on the same SBC or on a SBC cluster, where SBCs communicate with each other.

Figure 5:
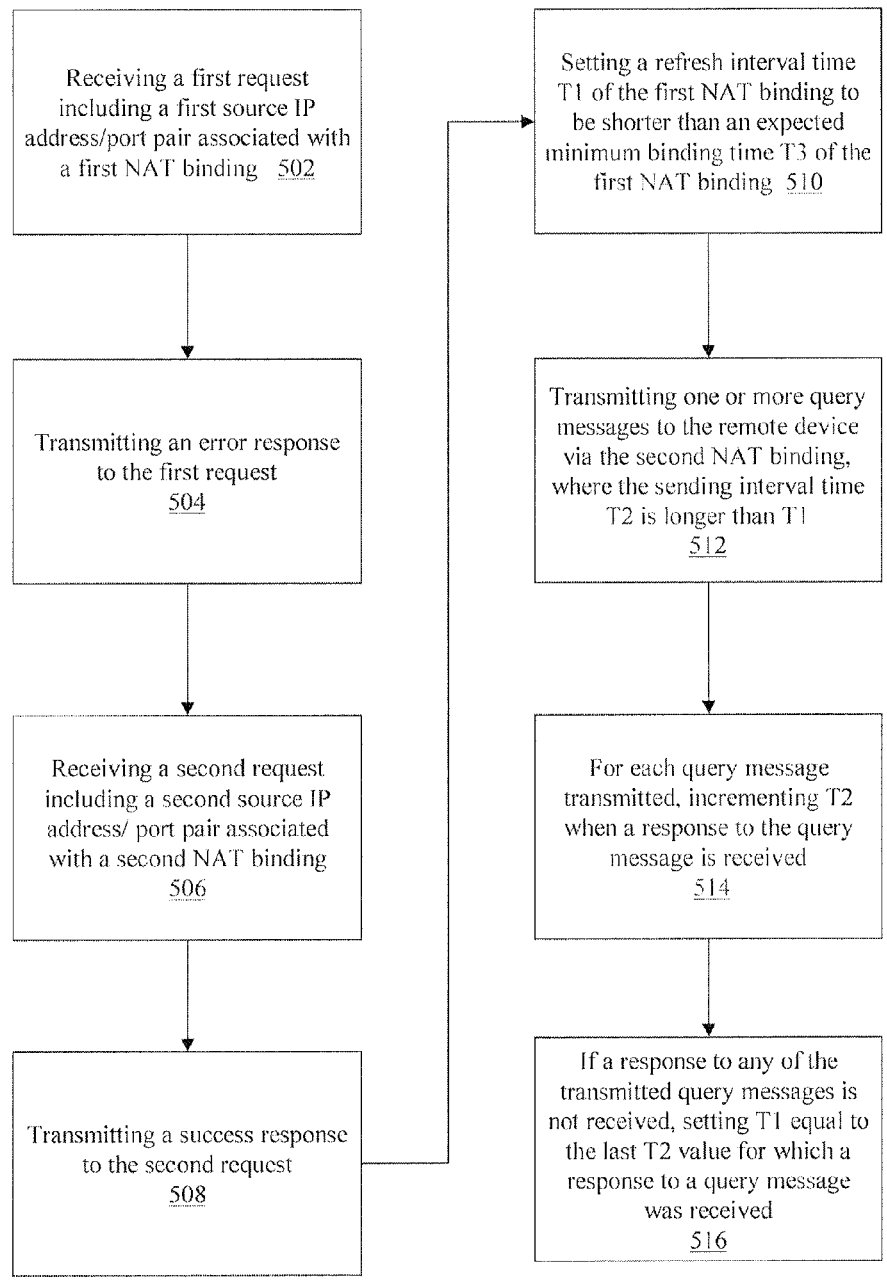
FIG. 5 is a flow diagram of a process for determining expiration time of bindings for NAT devices using a fully qualified domain name (FQDN).

FIG. 5 is a flow diagram of a process 500 for determining expiration time of bindings for NAT devices (e.g., NAT device 404 in FIG. 4) used in communications between a client device (e.g., client device 402 in FIG. 4) and a network device (e.g., network device 408 in FIG. 4) using an FQDN. The network device 408 receives (502) a first request (e.g., a SIP REGISTER request) from client device 402 via NAT device 404. The first request includes, as the destination IP address/port, the first IP address/port that resolves from the FQDN. When NAT device 404 receives the first request, the NAT device 404 translates the source IP address/port of the client device 402 into a temporary IP address/port available for use in a public network (e.g., public network 410 in FIG. 4). The NAT device 404 also creates a binding (e.g., rejected registration binding 440 in FIG. 4) that stores the mapped relationship between the source IP address/port of the client device 402 and the temporary IP address/port.

After receiving the first request, the network device 408 transmits (504) an error response to the first request to the client device 402 via the NAT device 404. An error response may result due to server overload or refusal to host certain registrations based on the Address of Record (AoR) to be registered. In preferred embodiments, the network device 408 artificially rejects the first request so that a probe channel can be created. The error response includes, as the destination IP address/port, the temporary IP address/port previously assigned to the first request by the NAT device 404. Upon receiving the error response, the NAT device 404 uses the binding 440 associated with the temporary IP address/port to locate the IP address/port of the client device 402 and transmit the response. Based on the request/response traffic flow, the NAT device 404 keeps binding 440 alive.

The network device 408 receives (506) a second request (e.g., a SIP REGISTER request) from the client device 402 via the NAT device 404. The second request includes, as the destination IP address/port, the second IP address/port that resolves from the FQDN. When the NAT device 404 receives the second request, the NAT device 404 again translates the source IP address/port of the client device 402 into another temporary IP address/port available for use in public network 410. The NAT device 404 creates a second binding (e.g., registration binding 420) with the source IP address/port of the client device 402 and the new temporary IP address/port.

After receiving the second request, the network device 408 transmits (508) a 200 (SUCCESS) response to the second request to the client device 402 via the NAT device 404. The 200 (SUCCESS) response includes, as the destination IP address/port, the temporary IP address/port previously assigned to the second request by the NAT device 404. Upon receiving the 200 (SUCCESS) response, the NAT device 404 uses the binding 420 associated with the temporary IP address/port to locate the IP address/port of the client device 402 and transmit the response. Based on the request/response traffic flow, the NAT device 404 keeps binding 420 alive.

The network device 408 sets (510) a refresh interval time T1 of NAT binding 420 to be shorter than an expected minimum expiration (or binding timeout) value of NAT binding 420. This technique provides the advantage of keeping NAT binding 420 open so that the signaling connection between client device 402 and network device 408 is not interrupted as the optimal binding timeout value associated with NAT device 404 is determined.

The network device 408 then uses the rejected registration NAT binding 440 as a probing channel to determine the optimal binding timeout value. To accomplish this, the network device 408 transmits (512) one or more query messages (e.g., SIP OPTIONS messages) to the client device 402 using NAT binding 440. The network device 408 assigns a sending interval time T2 to NAT binding 440 that is longer than the previously-established refresh interval time T1 of NAT binding 420. In the event that the network device 408 receives a response to a transmitted query message from the client device 402, the network device 408 determines that NAT binding 440 is still alive at NAT device 404 and, therefore, the NAT binding timeout value is at least equal to T2. Based on this knowledge, the network device 408 increments (314) T2 (e.g., by a predetermined length)

upon receiving the response to the query message. The transmission of query messages and corresponding incrementing of T2 continue until network device 408 does not receive a response to a transmitted query message. In the event that the network device 408 does not receive a response to a query message, the network device 408 determines that NAT binding 440 is no longer alive at NAT device 404 and the NAT binding timeout value is less than the current sending interval time. The network device 408 sets (516) T1 equal to the last T2 value for which a response to a query message was received. The network device 408 determines that the sending interval time of the last successful request/response cycle is the optimal registration binding expiration time.

In the event that registration binding 420 is subsequently deleted, the network device 408 restarts the process of determining the binding expiration time. It should be noted that different sending interval time values can be used if multiple rejected registration bindings, associated with different IP address/port pairs of the FQDN, were created by NAT device 404. The network device 408 can use the multiple rejected registration bindings in parallel to determine the expiration time of bindings created at NAT device 404. Preferably, the network device 408 is configured to coordinate the use of multiple rejected registration bindings for greater efficiency and speed in determining the binding expiration time.

In another aspect of this embodiment, multiple client devices may register simultaneously for AoR. Therefore, there is a need to know which SIP REGISTER requests for the same AoR originate from the same client device after the determination of binding expiration time is restarted. If supported, the client device can use the 'instance-id' parameter for this purpose. In this aspect, the network device 408 can consider the SIP REGISTER requests that have a Contact header with the same instance-id as coming from the same client device (e.g., client device 402). Alternatively, if it is known that all client devices comply with the expectation of the same Call-Id being used for all the SIP REGISTER requests belonging to the same registration process, Call-Id can be used to correlate REGISTER requests.

Figure 6:
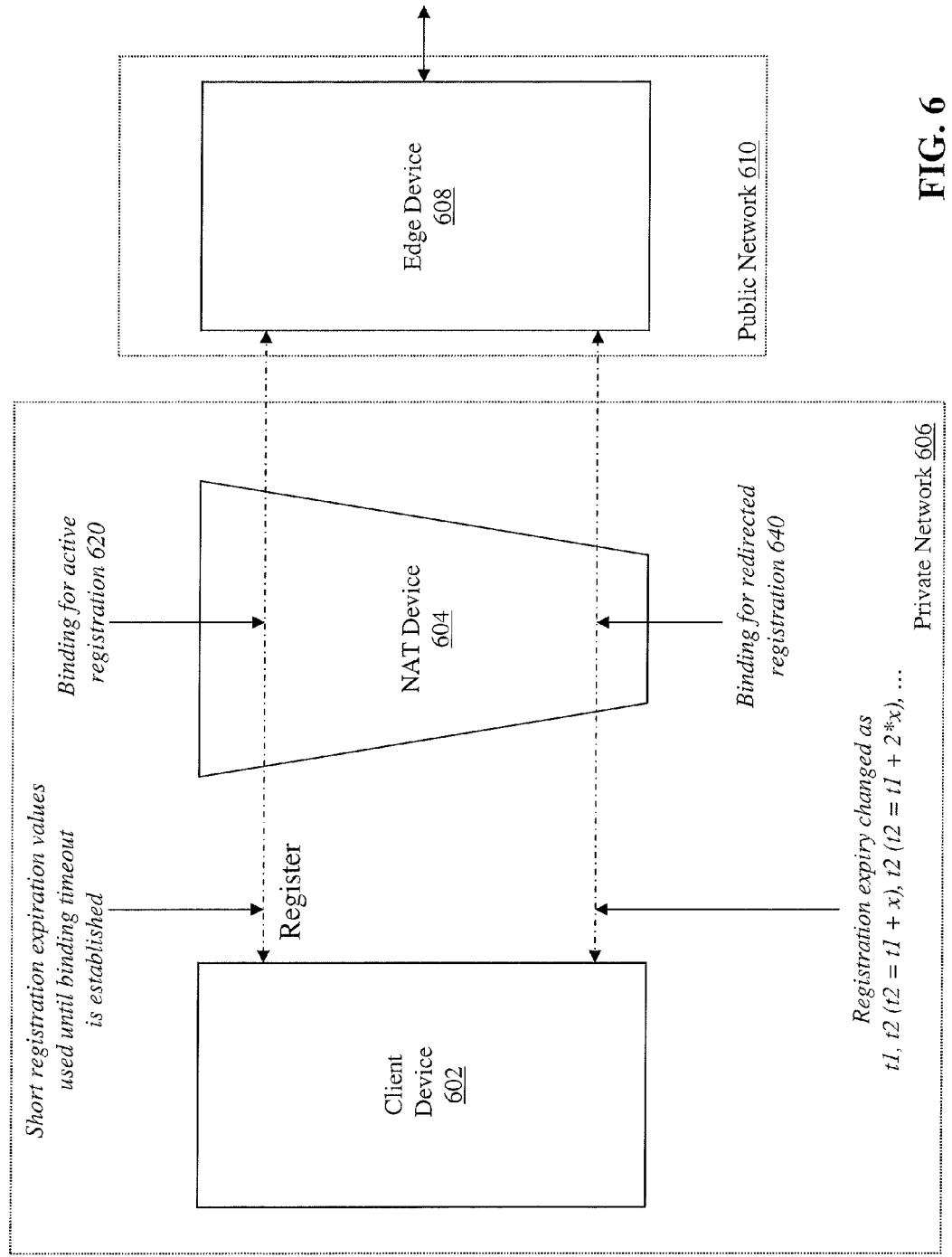
FIG. 6 is a block diagram of a system for determining expiration time of bindings for NAT devices using 3xx redirection.

FIG. 6 is a block diagram of a system 600 for determining expiration time of bindings for NAT devices using 3xx redirection. 3xx redirection refers to status codes used by SIP to indicate that a client device must take additional steps to complete a request. The system 600 includes a client device 602 and a NAT device 604 located within a private network 606. The system 600 further includes a network device 608 located in a public network 610.

Figure 7:
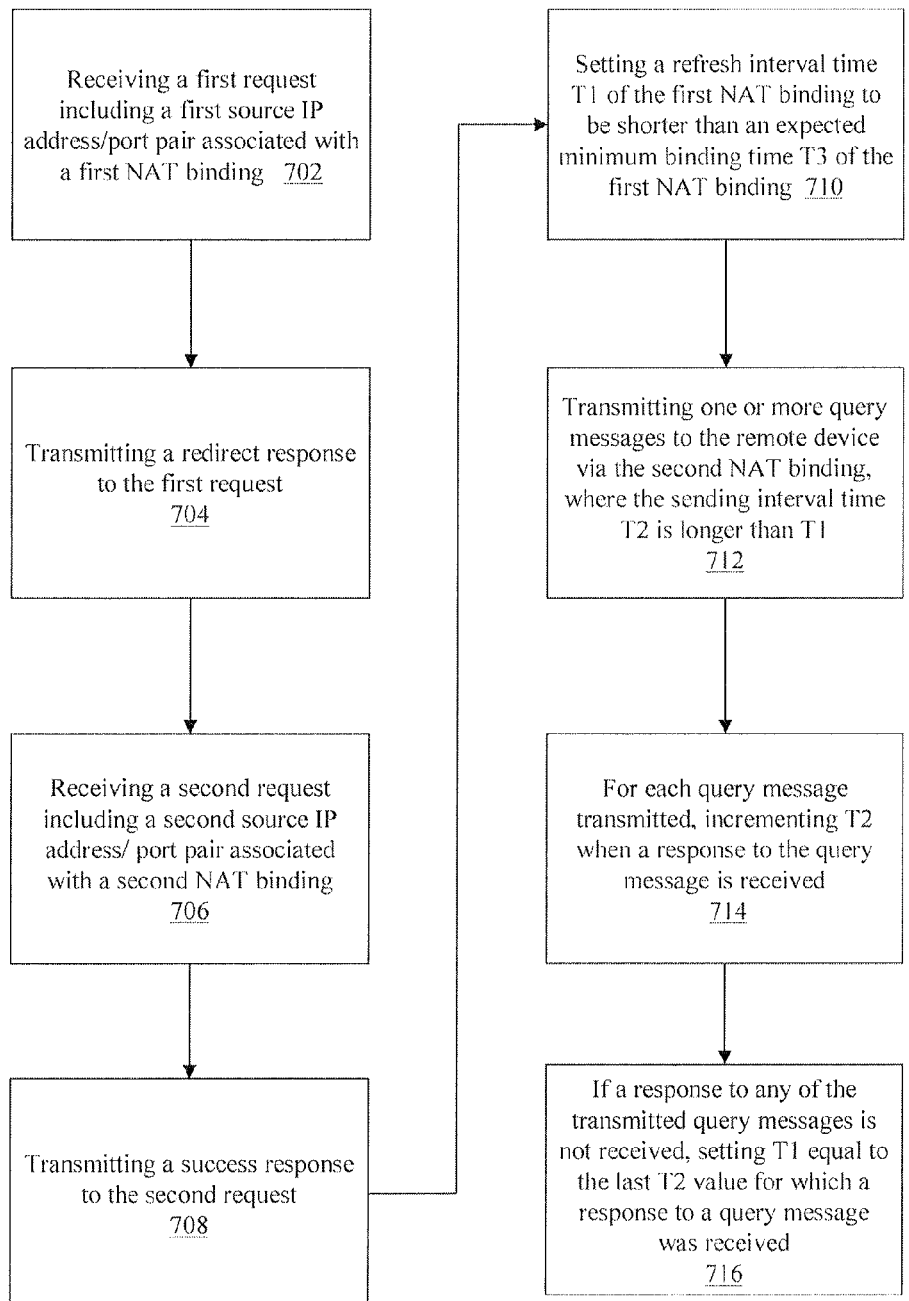
FIG. 7 is a flow diagram of a process for determining expiration time of bindings for NAT devices using 3xx redirection.

FIG. 7 is a flow diagram of a process 700 for determining expiration time of bindings for NAT devices (e.g., NAT device 604 in FIG. 6) used in communications between a client device (e.g., client device 602 in FIG. 6) and a network device (e.g., network device 608 in FIG. 6) using 3xx redirection. The network device 608 receives (702) a first request (e.g., a SIP REGISTER request) from client device 602 via NAT device 604. When NAT device 604 receives the first request, the NAT device 604 translates the source IP address/port of the client device 602 into a temporary IP address/port available for use in a public network (e.g., public network 610 in FIG. 6). The NAT device 604 also creates a binding (e.g., redirected registration binding 640 in FIG. 6) that stores the mapped relationship between the source IP address/port of the client device 602 and the temporary IP address/port.

After receiving the first request, the network device 608 transmits (704) a 302 Redirect response to the first request to the client device 602 via the NAT device 604. The 302 Redirect response includes, as the destination IP address/port, the temporary IP address/port previously assigned to the first request by the NAT device 604. The 302 Redirect response also includes an IP address/port to which the client device 602 is to direct subsequent traffic. Upon receiving the 302 Redirect response, the NAT device 604 uses the binding 640 associated with the temporary IP address/port to locate the IP address/port of the client device 602 and transmit the response. Based on the request/response traffic flow, the NAT device 604 keeps binding 640 alive.

The network device 608 receives (706) a second request (e.g., a SIP REGISTER request) from the client device 602 via the NAT device 604. The second request includes, as the destination IP address/port, the IP address/port received as part of the 302 Redirect response. When the NAT device 604 receives the second request, the NAT device 604 again translates the source IP address/port of the client device 602 into another temporary IP address/port available for use in public network 610. The NAT device 604 creates a second binding (e.g., registration binding 420) with the source IP address/port of the client device 602 and the new temporary IP address/port.

After receiving the second request, the network device 608 transmits (708) a response to the second request to the client device 602 via the NAT device 604. The response includes, as the destination IP address/port, the temporary IP address/port previously assigned to the second request by the NAT device 604. Upon receiving the response, the NAT device 604 uses the binding 620 associated with the temporary IP address/port to locate the IP address/port of the client device 602 and transmit the response. Based on the request/response traffic flow, the NAT device 604 keeps binding 620 alive.

The network device 608 sets (710) a refresh interval time T1 of NAT binding 620 to be shorter than an expected minimum binding timeout value of NAT binding 620. This technique provides the advantage of keeping NAT binding 620 open so that the signaling connection between client device 602 and network device 608 is not interrupted as the optimal binding timeout value associated with NAT device 604 is determined.

The network device 608 then uses the redirected registration NAT binding 640 as a probing channel to determine the optimal binding timeout value. To accomplish this, the network device 608 transmits (712) one or more query messages (e.g., SIP OPTIONS messages) to the client device 602 using NAT binding 640. The network device 608 assigns a sending interval time T2 to NAT binding 640 that is longer than the previously-established refresh interval time T1 of NAT binding 620. In the event that the network device 608 receives a response to the query message from the client device 602, the network device 608 determines that NAT binding 640 is still alive at NAT device 604 and, therefore, the NAT binding timeout value is at least equal to T2. Based on this knowledge, the network device 608 increments (714) T2 (e.g., by a predetermined length) upon receiving the response to the query message. The transmission of query messages and corresponding incrementing of T2 continue until network device 608 does not receive a response to a transmitted query message. In the event that the network device 608 does not receive a response to a query message, the network device 608 determines that NAT binding 640 is no longer alive at NAT device 604 and the NAT binding timeout value is less than the current sending interval time. The network device 608 sets (716) T1 equal to the last T2 value for which a response to a query message was received. The network device 608 determines that the sending interval time of the last successful request/response cycle is the optimal registration binding expiration time.

In the event that registration binding 620 is subsequently deleted, the network device 608 restarts the process of determining the binding expiration time. It should be noted that different sending interval time values can be used if multiple redirected registration bindings, associated with different IP address/port pairs, were created by NAT device 604. The network device 608 can use the multiple redirected registration bindings in parallel to determine the expiration time of bindings created at NAT device 604. Preferably, the network device 608 is configured to coordinate the use of multiple redirected registration bindings for greater efficiency and speed in determining the binding expiration time.

In another aspect of this embodiment, multiple client devices may register simultaneously for an AoR. Therefore, there is a need to know which SIP REGISTER requests for the same AoR originate from the same client device after the determination of binding expiration time is restarted. If supported, the client device can use the 'instance-id' parameter for this purpose. In this aspect, the network device can consider the SIP REGISTER requests that have a Contact header with the same instance-id as coming from the same client device. An alternative method is adding a parameter to the Contact header in 3xx responses, where the parameter is unique for the each initial SIP REGISTER request for an AoR. This parameter would be reflected in the Request-URI of all subsequent SIP REGISTER requests sent due to the 3xx response. Therefore, the network device 608 considers SIP REGISTER requests with the same parameter as arriving from the same client device (e.g., client device 602).

Figure 8:
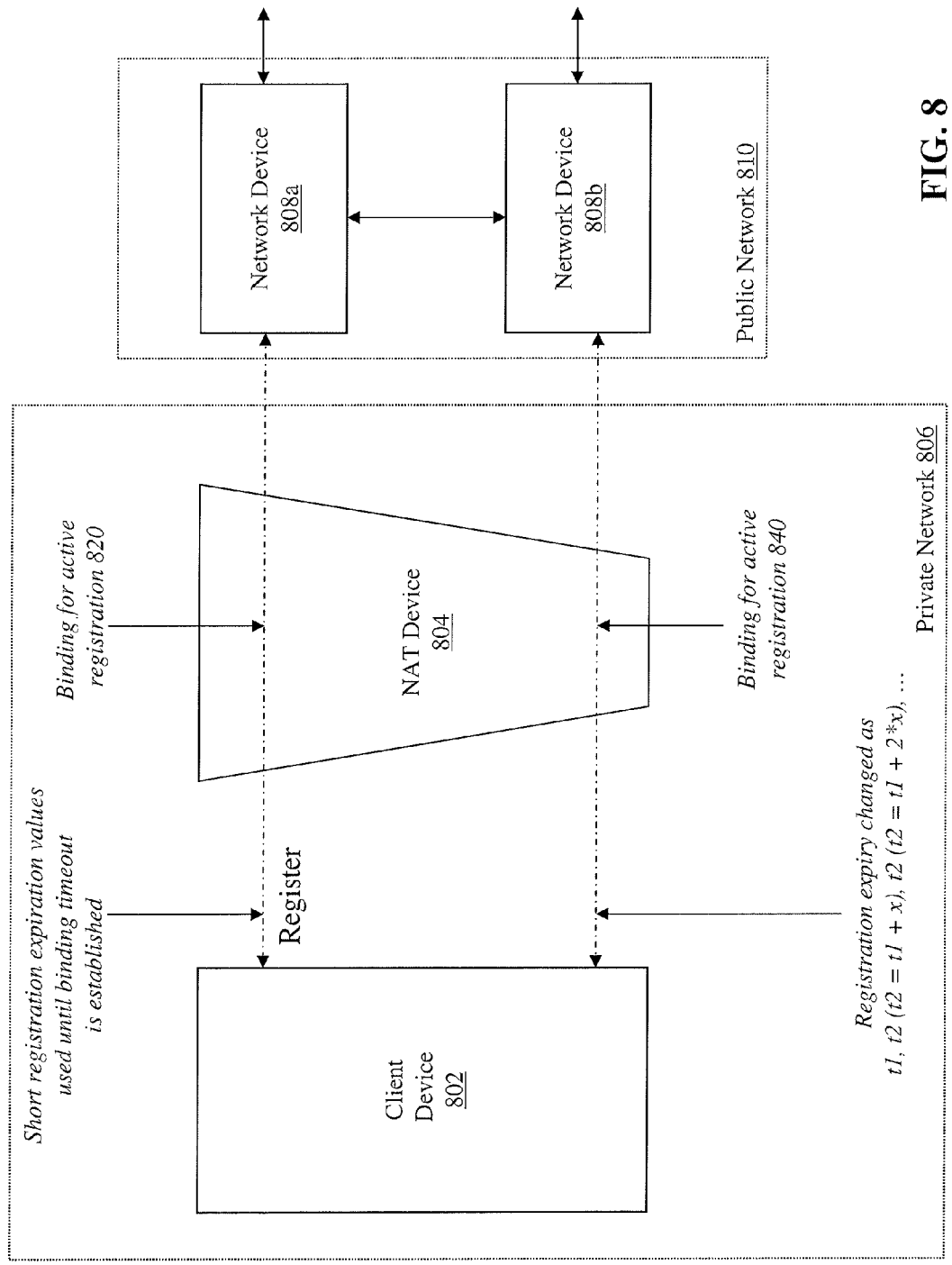
FIG. 8 is a block diagram of a system for determining expiration time of bindings for NAT devices using multiple registration paths.

FIG. 8 is a block diagram of a system 800 for determining expiration time of bindings for NAT devices (e.g., NAT device 804) using multiple registration paths. One example of the use of multiple registration paths is for purposes of redundancy to ensure minimal communication outage between the client device 802 and the public network 810. The system 800 includes a client device 802 and a NAT device 804 located within a private network 806. The system 800 further includes network devices 808a and 808b located in a public network 810. The network devices 808a and 808b communicate with each other.

Figure 9:
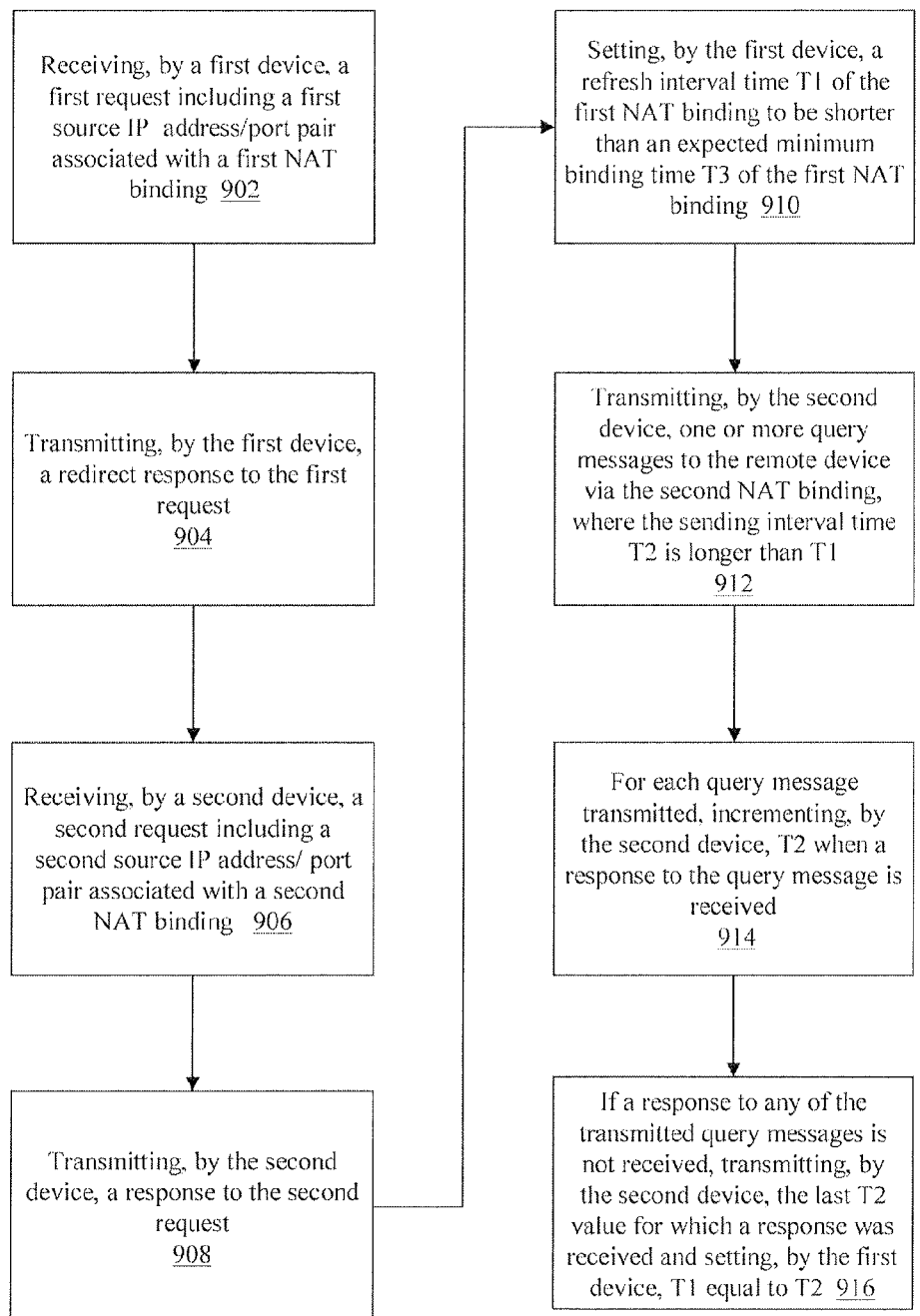
FIG. 9 is a flow diagram of a system for determining expiration time of bindings for NAT devices using multiple registration paths.

FIG. 9 is a flow diagram of a process 900 for determining expiration time of bindings for NAT devices (e.g., NAT device 804 in FIG. 8) used in communications between a client device (e.g., client device 802 in FIG. 8) and one or more network devices (e.g., network devices 808a and 808b in FIG. 8) using multiple registration paths. A network device 808a receives (902) a first request (e.g., a SIP REGISTER request) from client device 802 via NAT device 804. When NAT device 804 receives the first request, the NAT device 804 translates the source IP address/port of the client device 802 into a temporary IP address/port available for use in a public network (e.g., public network 810 in FIG. 8). The NAT device 804 also creates a binding (e.g., registration binding 820 in FIG. 8) that stores the mapped relationship between the source IP address/port of the client device 802 and the temporary IP address/port.

After receiving the first request, the network device 808a transmits (904) a response to the first request to the client device 802 via the NAT device 804. The response includes, as the destination IP address/port, the temporary IP address/port previously assigned to the first request by the NAT device 804. The response also includes an IP address/port to which the client device 802 is to direct subsequent traffic. Upon receiving the response, the NAT device 804 uses the binding 820 associated with the temporary IP address/port to locate the IP address/port of the client device 802 and transmit the response. Based on the request/response traffic flow, the NAT device 804 keeps binding 820 alive.

The network device 808b receives (906) a second request (e.g., a SIP REGISTER request) from the client device 802 via the NAT device 804. When the NAT device 804 receives the second request, the NAT device 804 again translates the source IP address/port of the client device 802 into another temporary IP address/port available for use in public network 810. The NAT device 804 creates a second binding (e.g., registration binding 840) with the source IP address/port of the client device 802 and the new temporary IP address/port.

After receiving the second request, the network device 808b transmits (908) a response to the second request to the client device 802 via the NAT device 804. The response includes, as the destination IP address/port, the temporary IP address/port previously assigned to the second request by the NAT device 804. Upon receiving the response, the NAT device 804 uses the binding 840 associated with the temporary IP address/port to locate the IP address/port of the client device 802 and transmit the response. Based on the request/response traffic flow, the NAT device 804 keeps binding 820 alive.

The network devices 808a and 808b communicate with each other to determine which signaling connection and associated binding is used for registration and which is used for probing the optimal binding timeout value. For purposes of the following description, registration binding 820 is associated with the registration connection, and registration binding 840 is associated with the probing connection. The network device 808a sets (910) a refresh interval time T1 of registration binding 820 to be shorter than an expected minimum expiration (or binding timeout) value of registration binding 820. This technique provides the advantage of keeping binding 820 open so that the signaling connection between client device 802 and network device 808a is not interrupted as the optimal binding timeout value associated with NAT device 804 is determined.

The network device 808b then uses the registration NAT binding 840 as a probing channel to determine the optimal binding timeout value. To accomplish this, the network device 808b transmits (912) one or more query messages (e.g., SIP OPTIONS messages) to the client device 802 using binding 840. The network device 808b assigns a sending interval time T2 to binding 840 that is longer than the previously-established refresh interval time T1 of binding 820. In the event that the network device 808b receives a response to the query message from the client device 802, the network device 808b determines that binding 840 is still alive at NAT device 804 and, therefore, the NAT binding timeout value is at least equal to T2. Based on this knowledge, the network device 808b increments (914) T2 (e.g., by a predetermined length) upon receiving the response to the query message. The transmission of query messages and corresponding incrementing of T2 continue until network device 808b does not receive a response to a transmitted query message. In the event that the network device 808b does not receive a response to a query message, the network device 808b determines that NAT binding 840 is no longer alive at NAT device 804 and the NAT binding timeout value is less than the current sending interval time. The network device 808b sets (916) T1 equal to the last T2 value for which a response to a query message was received. The network device 808b determines that the sending interval time of the last successful request/response cycle is the optimal registration binding expiration time.

The network device 808b also informs network device 808a of the new refresh interval time, and network device 808a sets the refresh interval time of the signaling connection associated with NAT binding 820 equal to the last T2 value for which a response to a query message was received.

In the event that registration binding 820 and/or registration binding 840 is subsequently deleted, the network device 808b restarts the process of determining the binding expiration time. It should be noted that different sending interval time values can be used if more than two registration paths are used by the client device 802, such that bindings with different IP address/port pairs were created by NAT device 804. The network devices can communicate with each other to coordinate the use the multiple registration bindings in parallel to determine the expiration time of bindings created at NAT device 804.

The process 900 described above is efficient if client device 802 does not send periodic keepalive packets to check the status of the connectivity to the network devices 808a and 808b. If client device 802 does send periodic keepalive packets, one signaling connection (either to network device 808a or network device 808b) is configured to use keepalive/REGISTER refresh values known to be lower than the minimum expected NAT binding timeout value. The selection of a signaling connection to be used for this purpose can be made as follows:

1) Client device 802 inserts an indicator/value (e.g., a SIP header, a parameter) into the initial SIP REGISTER request transmitted to 808a. The presence of this indicator/value causes the network device 808a to use shortest possible SIP REGISTER refresh interval value or the refresh interval specified in the received indicator/value.
2) Network device 808a inserts an indicator to the response to the initial SIP REGISTER message. The presence of this indicator causes the client device 802 to use the shortest possible keepalive interval value on the connection to network device 808a and no keepalive packets on the connection to network device 808b.
3) Network devices 808a and 808b communicate the frequency of the keepalive packets they each receive from client device 802 and determine which signaling connection has the shorter keepalive interval value.
4) Network device 808a inserts an indicator to the response to the initial REGISTER message. The presence of this indicator causes the client device 802 to open up a new TCP connection to network device 808a and send a REGISTER message without the use of keepalive packets on the new connection.

The network device (e.g., network device 808a) associated with the connection having the shorter keepalive interval value uses the shortest possible SIP REGISTER refresh interval value. The network device (e.g., network device 808b) that is not associated with the connection having the shorter keepalive interval value uses a large SIP REGISTER refresh value and does not run the probing process. The client device 802 uses the connection having the longer keepalive interval value to conduct the probing process, as described in the embodiments above.

Once the client device 802 determines the optimum keepalive interval value after executing the probing process, the client device 802 starts using the optimum keepalive interval value on each of the signaling connections. When the network device 808a, which had been associated with the connection having the shortest possible keepalive interval value, determines that the keepalive interval value has changed, the network device 808a starts using a large SIP REGISTER refresh value because a change in the keepalive interval value indicates that the client device 802 has determined the optimum keepalive value. In other embodiments, a client device can use multiple signaling connections to the same network device using these techniques.

In a variant of this embodiment, the network device 808a inserts an indicator into the response to the first SIP REGISTER request that signals the client device 802 to stop transmitting keepalive packets. In this variant, the probing process is controlled by the network devices 808a and 808b. Optionally, the network device 808a can insert another indicator into a response to a SIP REGISTER refresh message that signals the client device 802 to start transmitting keepalive packets again once the network device 808a determines the optimum NAT binding expiration value after completing the probing process. The network device 808a can also include the keepalive interval value to be used with the indicator.

In another variant of this embodiment, the network device 808a inserts an indicator in the response to the first SIP REGISTER request that signals the client device 802 to establish another signaling connection (e.g., to network device 808a or network device 808b) without closing the signaling connection currently established with network device 808a.

In another variant of this embodiment, the network device 808a uses the techniques described above in relation to the use of FQDN, by inserting an indicator into the error response to the SIP REGISTER request that signals to keep the signaling connection open. This signaling connection is used for the probing process, as described previously.

In another variant of this embodiment, the network device 808a uses the techniques described above in relation to the use of 3xx redirection, by inserting an indicator into the 302 redirect response to the SIP REGISTER request that signals to keep the signaling connection open. This signaling connection is used for the probing process, as described previously It should be understood that any of the above techniques or processes can be used in combination to achieve the goal of determining the optimal NAT binding expiration time. The above techniques or processes can also be tried sequentially in any order depending on network design, knowledge about deployed network equipment, or other considerations.

In addition, for all of the techniques and processes described above, once the optimal NAT binding expiration time is determined by the network device, the expiration time can be communicated to the client device. The client device can use the expiration time value to set or adjust the frequency of STUN keepalive/CRLF keepalive messages. The expiration time value can be communicated to the client device as a STUN message attribute, as a new SIP header/parameter added to a signaling message (e.g., an initial INVITE), an out-of-dialog OPTIONS message, a new SDP attribute, or by a proprietary message.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VoIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for determining expiration time of bindings for network address translation (NAT) devices, the method comprising:
   (a) receiving, by a first computing device from a remote computing device, via a NAT device, a first Session Initiation Protocol (SIP) registration request including a first source IP address/port pair associated with a first NAT binding, said first computing device being a Session Border Controller and said remote computing device being a smartphone;
   (b) transmitting, by the first computing device, a response to the first SIP registration request to the remote computing device;
   (c) receiving, by the first computing device from the remote computing device via the NAT device, a second SIP registration request including a second source IP address/port pair associated with a second NAT binding while said first NAT binding is alive;
   (d) transmitting, by the first computing device, a response to the second SIP registration request;
   (e) setting, by the first computing device, a refresh interval time T1 of the first NAT binding to be shorter than an expected minimum binding expiration time of the first NAT binding;
   (f) transmitting, by the first computing device, one or more query messages to the remote computing device via the second NAT binding, wherein a sending interval time T2 of the second NAT binding is longer than T1;
   (g) for each query message transmitted, incrementing, by the first computing device, T2 when a response to the query message is received; and
   (h) if a response to any of the transmitted query messages is not received, setting, by the first computing device, T1 equal to the last T2 value for which a response to a query message was received.

2. The method of claim 1, wherein the first source IP address/port pair and the second source IP address/port pair are associated with a fully qualified domain name (FQDN) of the first computing device or of a group of computing devices, the method further including:
   if a response to any of the transmitted query messages is not received, transmitting a Session Description Protocol SDP message from the first computing device to the remote computing device, said SDP message including a NAT binding expiration time value as a SDP attribute of said SDP message, said NAT binding expiration time value being equal to the last T2 value for which a response to a query message was received.

3. The method of claim 1 further comprising:
   receiving, by a third computing device from the remote computing device via the NAT device, a third request including a third source IP address/port pair associated with a third NAT binding;
   transmitting, by the third computing device, a response to the third request;
   transmitting, by the third computing device, one or more query messages to the NAT device via the third NAT binding, wherein a sending interval time T3 of the third NAT binding is longer than T1;
   for each query message transmitted by the third computing device, incrementing, by the third computing device, T3 when a response to the query message is received; and
   if a response to any of the transmitted query messages from the third computing device is not received, transmitting, by the third computing device to the first computing device, the last T3 value for which a response to a query message was received and setting, by the first computing device, T1 equal to T3.

4. The method of claim 1, further comprising:
   transmitting, by the first computing device to the remote computing device, a message including T1.

5. The method of claim 4, wherein the message is a STUN message and the value is a STUN message attribute.

6. The method of claim 4, wherein the message is a SIP signaling message and the value is a SIP header or a SIP parameter.

7. The method of claim 1, step (g) further comprising:
   incrementing, by the first computing device, T2 by a time value T7 for each received response to the query message;
   if a response to any of the transmitted query messages is not received, decreasing T7 and setting, by the first computing device, T2 equal to the last T2 value for which a response to a query message was received plus T7;
   when T7 is less than a threshold T9, setting, by the first computing device, T1 equal to the last T2 value for which a response to a query message was received.

8. The method of claim 7, wherein T7 and T9 are configurable.

9. The method of claim 1, step (h) further comprising:
   if a response to any of the transmitted query messages is not received, re-transmitting, by the first computing device, the query messages for which no response was received, using an interval T11.

10. The method of claim 9, wherein T11 is configurable.

11. The method of claim 9, wherein the re-transmitting occurs a predetermined number of times.

12. The method of claim 11, wherein the number of times that re-transmitting occurs is configurable.

13. A method for determining expiration time of bindings for network address translation (NAT) devices, the method comprising:
   (a) receiving, by a first computing device from a remote computing device, via a NAT device, a first Session Initiation Protocol (SIP) registration request including a first source IP address/port pair associated with a first NAT binding, said first computing device being a Session Border Controller and said remote computing device being a smartphone, said SIP registration request being a SIP REGISTER message;
   (b) transmitting, by the first computing device, a response to the first SIP registration request to the remote computing device;
   (c) receiving, by the first computing device from the remote computing device via the NAT device, a second SIP registration request including a second source IP address/port pair associated with a second NAT binding while said first NAT binding is alive, said second SIP registration request being a SIP REGISTER message;
   (d) transmitting, by the first computing device, a response to the second SIP registration request;
   (e) setting, by the first computing device, a refresh interval time T1 of the first NAT binding to be shorter than an expected minimum binding expiration time of the first NAT binding;
   (f) transmitting, by the first computing device, one or more query messages to the remote computing device via the second NAT binding, wherein a sending interval time T2 of the second NAT binding is longer than T1;

(g) for each query message transmitted, incrementing, by the first computing device, T2 when a response to the query message is received; and (h) if a response to any of the transmitted query messages is not received, setting, by the first computing device, T1 equal to the last T2 value for which a response to a query message was received;

transmitting a Session Description Protocol (SDP) message from the first computing device to the remote computing device, said SDP message including a NAT binding expiration time value as a SDP attribute of said SDP message, said NAT binding expiration time value being equal to the last T2 value for which a response to a query message was received;

receiving at said remote computing device said SDP message from said first computing device;

adjusting at said remote computing device the frequency of STUN keepalive messages using said NAT binding expiration time value included as said SDP attribute in said SDP message; and wherein the first source IP address/port pair and the second source IP address/port pair are associated with a fully qualified domain name (FQDN) of the first computing device or of a group of computing devices.

14. The method of claim 13, wherein the response to the first SIP registration request is an error message eventhough no error condition is present, said error message being sent to cause said remote device to send said second registration request to said first computing device and the response to the second SIP registration request is a success message.

15. The method of claim 13, wherein the one or more query messages are SIP OPTIONS messages.

16. The method of claim 13, wherein the response to the first SIP registration request is a 302 Redirect message, said 302 Redirect message including an IP address/port to which the remote device is to redirect subsequent messages directed to said first computing device and causing said remote device to send said second SIP registration request to said first computing device.

17. The method of claim 16 wherein said 302 Redirect message includes an indicator that signals to the remote device to keep the signaling connection associated with the first NAT binding alive.

18. The method of claim 13, further comprising:
periodically transmitting, by the first computing device, a test message to the remote device, once T1 is set to the last T2 value for which a response to a query message was received;
in the event that a response to the test message is not received by the first computing device, repeating steps (a)-(h).

19. The method of claim 13, wherein the response to the first SIP registration request includes an indicator message to the remote computing device to set T1 to be shorter than the expected minimum binding expiration time of the first NAT binding.

20. The method of claim 13, wherein the first SIP registration request includes an indicator message to the first computing device to set T1 to be shorter than the expected minimum binding expiration time of the first NAT binding.

21. The method of claim 13, wherein the response to the first SIP registration request includes an indicator message to the remote computing device to stop transmitting refresh messages.

22. The method of claim 13, wherein the first computing device, upon receipt of a response to at least one of the one or more query messages, transmits an indicator message to the remote computing device to start transmitting refresh messages.

23. The method of claim 22, wherein the indicator message includes T2.

24. A system for determining expiration time of bindings for network address translation (NAT) devices, the system comprising:

a first computing device, said first computing device being a session border controller, configured to:

(a) receive, from a remote computing device via a NAT device, a first Session Initiation Protocol (SIP) registration request including a first source IP address/port pair associated with a first NAT binding, said remote computing device being a smartphone;

(b) transmit, to the remote computing device via the NAT device, an error message in response to the first SIP registration request eventhough no error condition exists to cause said remote computing device to send a second SIP registration request to said first computing device;

(c) receive, from the remote computing device via the NAT device, said second SIP registration request including a second source IP address/port pair associated with a second NAT binding while said first NAT binding is alive;

(d) transmit, to the remote computing device via the NAT device, a response to the second request;

(e) set a refresh interval time T1 of the second NAT binding to be shorter than an expected minimum expiration time of the first NAT binding;

(f) transmit, to the NAT device, one or more query messages via the first NAT binding, wherein a sending interval time T2 of the first NAT binding is longer than T1;

(g) for each query message transmitted, incrementing T2 when a response to the query message is received; and (h) if a response to any of the transmitted query messages is not received, set T1 equal to the last T2 value for which a response to a query message was received.

25. The system of claim 24, the first computing device further configured to:
periodically transmit a test message to the remote device, once T1 is set to the last T2 value for which a response to a query message was received;
in the event that a response to the test message is not received, repeat steps (a)-(h).

26. The system of claim 24, further comprising:
a third computing device configured to:
receive, from the remote computing device via the NAT device, a third request including a third source IP address/port pair associated with a third NAT binding;
transmit, to the remote computing device via the NAT device, a response to the third request;
transmit, to the NAT device, one or more query messages via the third NAT binding, wherein a sending interval time T3 of the third NAT binding is longer than T1; and
for each query message, increment T3 when a response to the query message is received; and
if a response to any of the one or more query messages is not received, transmit, to the first computing device, the last T3 value for which a response to a query message was received, wherein the first computing device sets T1 equal to T3.

27. The system of claim 24, step (g) further comprising:
incrementing, by the first computing device, T2 by a time value T7 for each received response to the query message;
if a response to any of the transmitted query messages is not received, decreasing T7 and setting, by the first computing device, T2 equal to the last T2 value for which a response to a query message was received plus T7;
when T7 is less than a threshold T9, setting, by the first computing device, T1 equal to the last T2 value for which a response to a query message was received.

28. The system of claim 27, wherein T7 and T9 are configurable.

29. The system of claim 24, step (h) further comprising:
if a response to any of the transmitted query messages is not received, re-transmitting, by the first computing device, the query messages for which no response was received, using an interval T11.

30. The system of claim 29, wherein the re-transmitting occurs a predetermined number of times.

31. The system of claim 24, wherein said session border controller is further configured to insert an indicator into the error message transmitted in response to the first SIP registration request that signals to the remote device to keep the signaling connection associated with the first binding open.

32. The system of claim 31, wherein said error message is a rejection of the first SIP registration request.

33. The system of claim 24 wherein said Session Border Controller is further configured to:
receive, from the remote computing device via the NAT device, a third SIP registration request message prior to receiving said first SIP registration request from said remote computing device, said third SIP registration request including a third source IP address/port pair associated with a third NAT binding;
transmit, to the remote computing device via the NAT device, an error message in response to the third request eventhough no error condition exists to cause said remote computing device to send said first SIP registration request to said first computing device while keeping said third NAT binding connection alive;
transmit, to the NAT device, one or more query messages via the third NAT binding, wherein a sending interval time T3 of the third NAT binding is longer than T2;
for each query message transmitted via the third NAT binding incrementing T3 by an amount different than T2 is incremented;
and if a response to any of the transmitted query messages is not received, set T1 equal to the last T3 value for which a response to a query message was received.

34. A computer program product, tangibly embodied in a computer readable storage device, for determining expiration time of bindings for network address translation (NAT) devices, the computer program product including instructions operable to cause a data processing apparatus to:
(a) receive, from a remote computing device via a NAT device, a first Session Initiation Protocol (SIP) registration request including a first source IP address/port pair associated with a first NAT binding, said remote computing device being a smartphone;
(b) transmit, to the remote computing device via the NAT device, a response to the first SIP registration request, said response including an instruction to cause said remote computing device to transmit a second SIP registration request to said data processing apparatus;
(c) receive, from the remote computing device via the NAT device, said second SIP registration request including a second source IP address/port pair associated with a second NAT binding while said first NAT binding is alive;
(d) transmit, to the remote computing device via the NAT device, a response to the second SIP registration request;
(e) set a refresh interval time T1 of the second NAT binding to be shorter than an expected minimum expiration time of the second NAT binding;
(f) transmit, to the NAT device, one or more query messages via the first NAT binding, wherein a sending interval time T2 of the first NAT binding is longer than T1;
(g) for each query message transmitted, increment T2 when a response to the query message is received; and
(h) if a response to any of the transmitted query messages is not received, set T1 equal to the last T2 value for which a response to a query message was received.

35. The method of claim 34, the computer program product further including instructions operable to cause the data processing apparatus to:
periodically transmit a test message to the remote device, once T1 is set to the last T2 value for which a response to a query message was received;
in the event that a response to the test message is not received, repeat steps (a)-(h).

36. The computer program product of claim 34, further including instructions operable to cause a second data processing apparatus to:
receive, from the remote computing device via the NAT device, a third request including a third source IP address/port pair associated with a third NAT binding;
transmit, to the remote computing device via the NAT device, a response to the third request;
transmit, to the NAT device, one or more query messages via the third NAT binding, wherein a sending interval time T3 of the third NAT binding is longer than T1;
for each query message transmitted, increment T3 when a response to the query message is received; and
if a response to any of the transmitted query messages is not received, transmit, to the first data processing apparatus, the last T3 value for which a response to a query message was received, wherein the first data processing apparatus sets T1 equal to T3.

37. The computer program product of claim 34, step (g) further comprising:
incrementing, by the data processing apparatus, T2 by a time value T7 for each received response to the query message;
if a response to any of the transmitted query messages is not received, decreasing T7 and setting, by the data processing apparatus, T2 equal to the last T2 value for which a response to a query message was received plus T7;
when T7 is less than a threshold T9, setting, by the data processing apparatus, T1 equal to the last T2 value for which a response to a query message was received.

38. The computer program product of claim 37, wherein T7 and T9 are configurable.

39. The computer program product of claim 34, step (h) further comprising:
if a response to any of the transmitted query messages is not received, re-transmitting, by the first computing device, the query messages for which no response was received, using an interval T11.

40. The computer program product of claim 34, wherein said response to said first registration request is a redirect message, said redirect message including an IP address/port to which the remote device is to redirect subsequent traffic.

* * * * *